(12) United States Patent
Liang et al.

(10) Patent No.: US 9,722,245 B2
(45) Date of Patent: Aug. 1, 2017

(54) SULFUR-CARBON NANOCOMPOSITES AND THEIR APPLICATION AS CATHODE MATERIALS IN LITHIUM-SULFUR BATTERIES

(71) Applicant: UT-Battelle, LLC, Oak Ridge, TN (US)

(72) Inventors: Chengdu Liang, Knoxville, TN (US); Nancy J. Dudney, Knoxville, TN (US); Jane Y. Howe, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 287 days.

(21) Appl. No.: 14/687,385

(22) Filed: Apr. 15, 2015

(65) Prior Publication Data

US 2015/0221949 A1    Aug. 6, 2015

Related U.S. Application Data

(62) Division of application No. 12/874,254, filed on Sep. 2, 2010, now Pat. No. 9,023,528.

(Continued)

(51) Int. Cl.
*H01M 4/58* (2010.01)
*H01M 4/133* (2010.01)
(Continued)

(52) U.S. Cl.
CPC ........... *H01M 4/5815* (2013.01); *C01B 31/12* (2013.01); *H01M 4/0402* (2013.01);
(Continued)

(58) Field of Classification Search
None
See application file for complete search history.

(56) References Cited

U.S. PATENT DOCUMENTS 4,410,609 A    10/1983  Peled et al.
4,450,214 A    5/1984   Davis
(Continued)

FOREIGN PATENT DOCUMENTS

CN    101587951 A   *  11/2009

OTHER PUBLICATIONS

Cheon S-E et al., "Rechargeable Lithium Sulfur Battery II. Rate Capability and Cycle Characteristics", Journal of the Electrochemical Society 150(6):A800-A805 (2003).

(Continued)

*Primary Examiner* — Maria J Laios
*Assistant Examiner* — Robert S Carrico
(74) *Attorney, Agent, or Firm* — Scully Scott Murphy & Presser

(57) ABSTRACT

The invention is directed in a first aspect to a sulfur-carbon composite material comprising: (i) a bimodal porous carbon component containing therein a first mode of pores which are mesopores, and a second mode of pores which are micropores; and (ii) elemental sulfur contained in at least a portion of said micropores. The invention is also directed to the aforesaid sulfur-carbon composite as a layer on a current collector material; a lithium ion battery containing the sulfur-carbon composite in a cathode therein; as well as a method for preparing the sulfur-composite material.

9 Claims, 9 Drawing Sheets

Related U.S. Application Data

(60) Provisional application No. 61/239,132, filed on Sep. 2, 2009.

(51) Int. Cl.

| | | |
|---|---|---|
| *H01M 4/04* | (2006.01) | |
| *H01M 10/0565* | (2010.01) | |
| *H01M 4/36* | (2006.01) | |
| *H01M 10/0566* | (2010.01) | |
| *H01M 10/0569* | (2010.01) | |
| *H01M 4/1397* | (2010.01) | |
| *C01B 31/12* | (2006.01) | |
| *H01M 4/1393* | (2010.01) | |
| *H01M 4/136* | (2010.01) | |
| *H01M 4/587* | (2010.01) | |
| *H01M 4/62* | (2006.01) | |
| *H01M 10/0567* | (2010.01) | |
| *H01M 10/052* | (2010.01) | |
| *H01M 4/02* | (2006.01) | |

(52) U.S. Cl.
CPC ....... *H01M 4/0416* (2013.01); *H01M 4/0471* (2013.01); *H01M 4/133* (2013.01); *H01M 4/136* (2013.01); *H01M 4/1393* (2013.01); *H01M 4/1397* (2013.01); *H01M 4/362* (2013.01); *H01M 4/364* (2013.01); *H01M 4/581* (2013.01); *H01M 4/587* (2013.01); *H01M 4/625* (2013.01); *H01M 10/052* (2013.01); *H01M 10/0565* (2013.01); *H01M 10/0566* (2013.01); *H01M 10/0567* (2013.01); *H01M 10/0569* (2013.01); *H01M 2004/021* (2013.01); *Y02E 60/122* (2013.01); *Y02T 10/7011* (2013.01)

(56) References Cited

U.S. PATENT DOCUMENTS

| | | | |
|---|---|---|---|
| 5,401,393 A * | 3/1995 | Whitehurst ............ | C10G 25/02 208/251 R |
| 5,686,201 A | 11/1997 | Chu | |
| 6,017,651 A | 1/2000 | Nimon et al. | |
| 6,025,094 A | 2/2000 | Visco et al. | |
| 6,030,720 A | 2/2000 | Chu et al. | |
| 6,225,002 B1 | 5/2001 | Nimon et al. | |
| 7,361,431 B2 | 4/2008 | Kim et al. | |
| 2003/0113624 A1 | 6/2003 | Kim et al. | |
| 2004/0047798 A1 | 3/2004 | Oh et al. | |
| 2008/0160391 A1 | 7/2008 | Joo et al. | |
| 2009/0311604 A1 | 12/2009 | Nazar et al. | |
| 2009/0317613 A1 | 12/2009 | Meisner et al. | |
| 2009/0317720 A1 * | 12/2009 | Richard ............... | H01M 4/133 429/231.8 |
| 2010/0276631 A1 | 11/2010 | Mabuchi et al. | |
| 2011/0052998 A1 | 3/2011 | Liang et al. | |

OTHER PUBLICATIONS

Choi M. et al., "Mesoporous Carbons with KOH Activated Framework and Their Hydrogen Adsorption", Journal of Materials Chemistry 17:4204-4209 (2007).
Lai C. et al., "Synthesis and Electrochemical Performance of Sulfur/Highly Porous Carbon Composites", J. Phys. Chem., 113, 4712-4716 (2009).
Liang C et al., "Hierarchically Structured Sulfur/Carbon Nanocomposite Material for High-Energy Lithium Battery", Chem. Mater. 21, 4724-4730 (2009).
Liang C. et al., "Synthesis of Mesoporous Carbon Materials Via Enhanced Hydrogen-Bonding Interaction", Journal of the American Chemical Society 128(16):5316-5317 (2006).
Liang C. et al., "Synthesis of a Large-Scale Highly Ordered Porous Carbon Film by Self-Assembly of Block Copolymers", Angewandte Chemie-International Edition 43:5785-5789 (2004).
Peled E. et al., "Lithium-Sulfur Battery: Evaluation of Dioxolane-Based Electrolytes", J. Electrochem. Soc. 136 (6):1621-1625 (1989).
Shin J.H. et al., "Preparation and Characterization of Plasticized Polymer Electrolytes Based on the PVdF-HFP Copolymer for Lithium/Sulfur Battery", Journal of Materials Science-Materials in Electronics 13:727-733 (2002).
Wang X. et al., "Facile Synthesis of Ordered Mesoporous Carbons With High Thermal Stability by Self-Assembly of Resorcinol-Formaldehyde and Block Copolymers Under Highly Acidic Conditions", Langmuir 24(14):7500-7505 (2008).
Wang J.L. et al., "Sulfur-Carbon Nano-Composite as Cathode for Rechargeable Lithium Battery Based on Gel Electrolyte", Electrochemistry Communications 4:499-502 (2002).
International Search Report dated May 30, 2011, issued in corresponding PCT Application No. PCT/US2010/047535.
U.S. Final Office Action dated Oct. 8, 2013 in U.S. Appl. No. 12/874,254.
U.S. Office Action dated May 21, 2013 in U.S. Appl. No. 12/874,254.

* cited by examiner

SULFUR-CARBON NANOCOMPOSITES AND THEIR APPLICATION AS CATHODE MATERIALS IN LITHIUM-SULFUR BATTERIES

CROSS REFERENCE TO RELATED APPLICATIONS

The application is a divisional of U.S. application Ser. No. 12/874,254, filed on Sep. 2, 2010, which claims the benefit of priority from U.S. Provisional Application No. 61/239,132, filed on Sep. 2, 2009, the content of which in its entirety is incorporated herein by reference.

This invention was made with government support under Contract Number DE-AC05-00OR22725 between the United States Department of Energy and UT-Battelle, LLC. The U.S. government has certain rights in this invention.

FIELD OF THE INVENTION

The present invention relates generally to cathode materials for lithium ion batteries, and more particularly, cathode materials for lithium-sulfur batteries.

BACKGROUND OF THE INVENTION

Lithium-ion batteries have found widespread usage as electrical energy storage devices in various portable electronics because of their light weight relative to other types of batteries. However, particularly for high power applications such as electric vehicles, there has been a continuing effort to improve the energy output and useful lifetime in lithium ion batteries to better suit these high power applications.

Lithium-sulfur (Li/S) batteries, in particular, hold great promise for high power applications. Lithium-sulfur batteries have a theoretical capacity of 1675 mAhg$^{-1}$, nearly one magnitude higher than that of LiFePO$_4$ (theoretical capacity of 176 mAhg$^{-1}$). Nevertheless, the Li/S system has not yet been implemented in high power applications because of two significant obstacles: the poor electrical conductivity of elemental sulfur and the intrinsic polysulfide shuttle.

The electrical conductivity of elemental sulfur is as low as 5×10$^{-30}$ S/cm at 25° C. Such a low conductivity causes poor electrochemical contact of the sulfur and leads to low utilization of active materials in the cathode. Although compositing elemental sulfur with carbon or conducting polymers significantly improves the electrical conductivity of sulfur-containing cathodes, the porous structure of the cathode still needs optimization to facilitate the transport of ions while retaining the integrity of the cathode after dissolution of sulfur at the discharge cycle.

The sulfur in the cathode, except at the full charge state, is generally present as a solution of polysulfides in the electrolyte. The concentration of polysulfide species $S_n^{2-}$ with n greater than 4 at the cathode is generally higher than that at the anode, and the concentration of $S_n^{2-}$ with n smaller than 4 is generally higher at the anode than the cathode. The concentration gradients of the polysulfide species drive the intrinsic polysulfide shuttle between the electrodes, and this leads to poor cyclability, high current leakage, and low charge-discharge efficiency.

Most importantly, a portion of the polysulfide is transformed into lithium sulfide, which is deposited on the anode. This deposition process occurs in each charge/discharge cycle and eventually leads to the complete loss of capacity of the sulfur cathode. The deposition of lithium sulfide also leads to an increase of internal cell resistance due to the insulating nature of lithium sulfide. Progressive increases in charging voltage and decreases in discharge voltage are common phenomena in lithium-sulfur batteries because of the increase of cell resistance in consecutive cycles. Hence, the energy efficiency decreases with the increase of cycle numbers.

Much research has been conducted to mitigate the negative effect of the polysulfide shuttle. The bulk of this research has focused on either the protection of lithium anode or the restraining of the ionic mobility of the polysulfide anions. However, protection of the lithium anode leads to the passivation of the anode, and this in turn causes a slow reaction rate of the anode during the discharge cycle. Therefore, protection of the lithium anode leads to the loss of power density. Gel electrolytes and solid electrolytes have also been used as a means for slowing down the polysulfide shuttle by reducing the ionic mobility of electrolytes. However, the slow transport of ions leads to a low power density. Moreover, neither the protection of lithium anode nor the restraining of ionic mobility completely shuts down the polysulfide shuttle. Although the polysulfide shuttle occurs at slow speed, such modified Li/S batteries generally suffer from a significantly shortened lifespan as compared to lithium ion batteries without these modifications.

Accordingly, there is a need for lithium-sulfur batteries with an improved electrical power output (i.e., improved power density) or improved usable lifetime. There would be a particular benefit in a lithium-sulfur battery possessing both an improved power output and an improved usable lifetime. In achieving the aforementioned goals, there is a particular need for a lithium-sulfur battery design that minimizes or altogether prevents the irreversible deposition of lithium sulfide on the lithium anode of the battery.

SUMMARY OF THE INVENTION

In one aspect, the invention is directed to a sulfur-carbon (S/C) composite material useful as a cathodic material in a lithium-sulfur battery. Special design features have been incorporated into the sulfur-carbon composite material that permits the composite material to substantially minimize the formation of lithium sulfide at the anode.

The sulfur-carbon composite material preferably includes (i) a bimodal porous carbon component containing therein a first mode of pores which are mesopores, and a second mode of pores which are micropores; and (ii) elemental sulfur contained in at least a portion of said micropores. In this composite material, the micropores advantageously function as nanosized containers for elemental sulfur, wherein the high surface area of the micropores provide efficient contact between the transporting electrons, ions and/or current collector and the insulating sulfur, thereby providing a high electrical conductivity to the composite material. In contrast, the mesopores advantageously function to facilitate transport of lithium ions during the electrochemical cycling and accommodate the polysulfides and sulfide ions resulting from the electrochemical reactions. As a result of these dual features, the composite material advantageously retains sulfur via the micropores (which minimizes lithium sulfide build up on the anode and which extends the useful life of the battery), while at the same time promoting a high energy output by facilitating lithium ion transport via the mesopores.

In another aspect, the invention is directed to a lithium ion (i.e., lithium-sulfur) battery containing an anode that contains the above sulfur-carbon composite material. The lithium battery can employ a liquid, solid, or gel electrolyte medium. In a preferred embodiment, the lithium battery includes a halide-containing additive. The halide-containing additive provides the particularly advantageous feature of reacting with lithium sulfide to produce electrochemically reversible polysulfides. The polysulfides can then be further oxidized to elemental sulfur, thereby providing a regeneration step of sulfur, and thus further extending the useful life of the battery.

In another aspect, the invention is directed to a novel and facile method for preparing the sulfur-carbon composites described above. The method involves impregnating a porous carbon component with a solution of elemental sulfur. In a preferred embodiment, the method involves (i) impregnating a bimodal porous carbon component with a solution of elemental sulfur, wherein the bimodal porous carbon component contains a first mode of pores which are mesopores, and a second mode of pores which are micropores; and (ii) annealing the dried and sulfur-impregnated bimodal porous carbon component under an inert atmosphere.

The cycling I-V curves shown in this figure were plotted from cycle number 60 to 100. The battery was cycled between 1.0 to 3.6 volts at 25° C. for 145 cycles.

Figure 9:
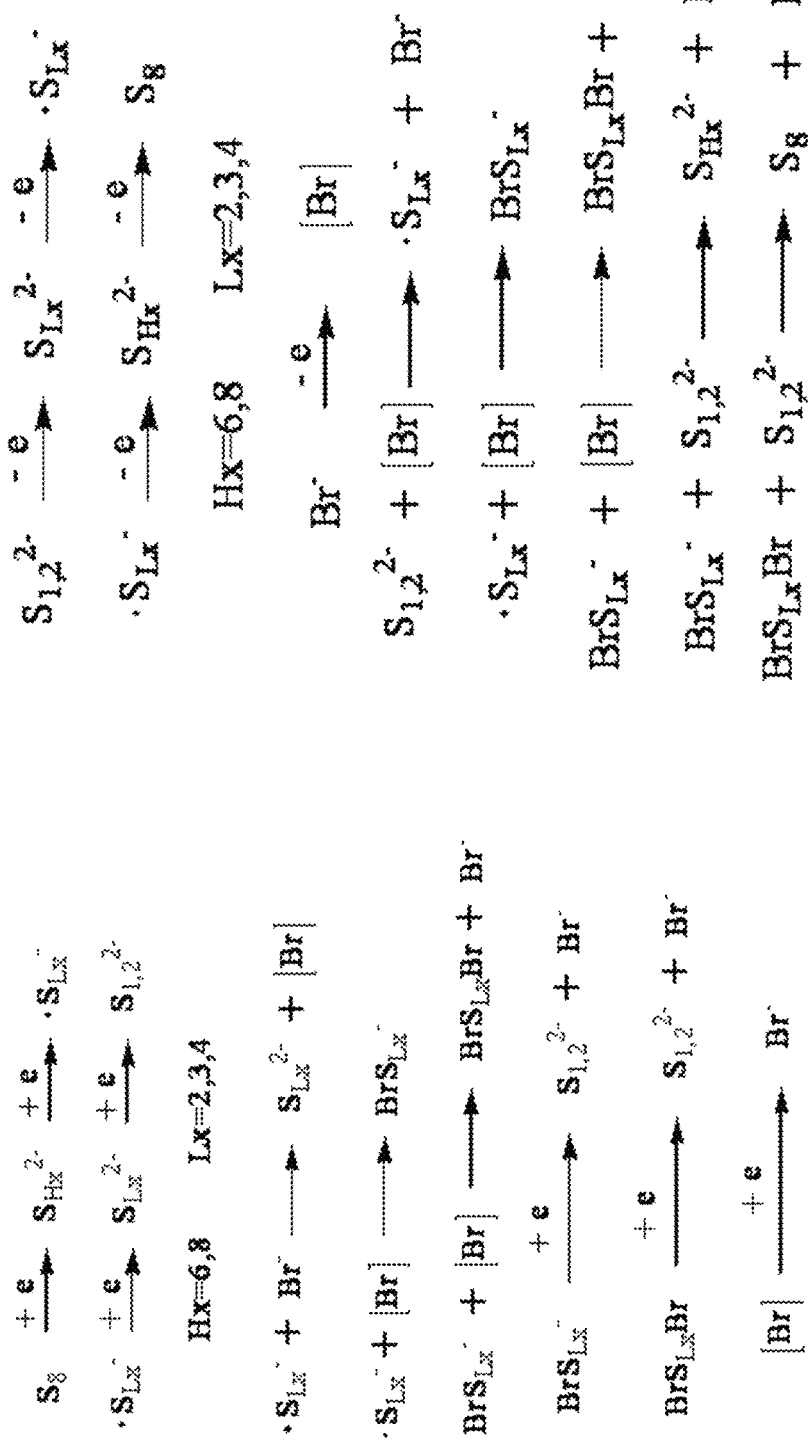

FIG. 9. Mechanism of the battery chemistry: the left column shows the chemical processes involved in the discharging process, whereas the right column shows the chemical processes involved in the charging process. The shaded blocks show the chemistry without halides. Bromine is meant to be representative of any halide.

DETAILED DESCRIPTION OF THE INVENTION

In a first aspect, the invention is directed to a sulfur-carbon composite material (i.e., the "composite material") containing (i) a bimodal porous carbon component containing therein a first mode of pores which are mesopores, and a second mode of pores which are micropores; and (ii) elemental sulfur contained in at least a portion of the micropores.

As commonly understood in the art, "mesopores" refer to pore sizes of 2 to 50 nm, whereas "micropores" refer to pore size of less than 2 nm. In one embodiment, the terms "mesopores" and "micropores" are in accordance with the foregoing definitions. In another embodiment, the term "micropores" can also include pore sizes of less than 3 nm, while "mesopores" are meant to refer to pore sizes of 3 to 50 nm. Generally, micropores and mesopores have a circular shape, which can be an approximately circular (e.g., ellipsoidal) or completely circular shape. For pores having a circular shape, the pore size refers either to the surface diameter of the pore (in the case of a completely circular pore) or the longest surface diameter of the pore (in the case of an elliptical pore). The pores can also be non-circular, or even irregular-shaped. Furthermore, a portion, or even all, of the micropores and/or the mesopores may have one surface dimension within the micropore size range (i.e., <2 nm or <3 nm) or mesopore size range (i.e., 2-50 nm or 3-50 nm), respectively, while another surface dimension is outside one or both of these ranges. For example, in a particular embodiment, micropores are present in the form of interconnected lines or cracks which have one surface dimension within a micropore size range and another dimension in the microscopic or macroscopic range (e.g., more than 1 micron and up to millimeters or greater) within the bimodal porous carbon material. The microporous interconnected lines or cracks may, in one embodiment, connect with some or all of the mesopores, or alternatively, not interconnect with mesopores.

The bimodal porous carbon material (and resulting sulfur-carbon composite material) can be suitably adjusted in pore size (i.e., pore size ranges), pore size distribution (vol % distribution of different pore sizes or pore size ranges), and other features (e.g., pore wall thickness and pore-pore inter-spacing or arrangement). For example, in particular embodiments, the composite material contains micropores within a size range having a minimum of 0.5 nm, 1 nm, or 2 nm, and a maximum of 1 nm, 2 nm, or 3 nm. In the same or separate embodiments, the composite material contains mesopores within a size range having a minimum and a maximum size selected from any two of the following values: 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 25 nm, 30 nm, 35 nm, 40 nm, 45 nm, and 50 nm.

At least 5% and no more than 90% of the pore volume of the bimodal porous carbon component is attributable to micropores. In different embodiments, at least, or no more than, or about 5%, 10%, 15%, 20%, 25%, 30%, 35%, 40%, 45%, 50%, 55%, 60%, 65%, 70%, 75%, 80%, 85%, or 90% of the pore volume of the bimodal porous carbon component is attributable to micropores. In other embodiments, the volume percentage attributed to micropores is within a particular range bounded by any two of the foregoing values (e.g., 10-90%, 10-80%, 20-90%, or 20-80% as particular examples).

The bimodal porous carbon component can have any suitable total pore volume. For example, in different embodiments, the total pore volume can be at least 0.5 $cm^3/g$, 0.6 $cm^3/g$, 0.7 $cm^3/g$, 0.8 $cm^3/g$, 0.9 $cm^3/g$, 1 $cm^3/g$, 1.1 $cm^3/g$, 1.2 $cm^3/g$, 1.3 $cm^3/g$, 1.4 $cm^3/g$, 1.5 $cm^3/g$, 1.6 $cm^3/g$, 1.7 $cm^3/g$, 1.8 $cm^3/g$, 1.9 $cm^3/g$, 2 $cm^3/g$, 2.1 $cm^3/g$, or 2.2 $cm^3/g$, or within a range bounded by any two of these values.

The bimodal porous carbon component can have any suitable wall thickness of the pores. For example, in different embodiments, the wall thickness can be about, at least, or less than 1 nm, 2 nm, 3 nm, 4 nm, 5 nm, 6 nm, 7 nm, 8 nm, 9 nm, 10 nm, 11 nm, 12 nm, 15 nm, 18 nm, 20 nm, 25 nm, or 30 nm, or a range bounded by any two of these values.

The bimodal porous carbon component can also have any suitable surface area. For example, in different embodiments, the surface area can be at least 300 $m^2/g$, 400 $m^2/g$, 500 $m^2/g$, 600 $m^2/g$, 700 $m^2/g$, 800 $m^2/g$, 900 $m^2/g$, 1000 $m^2/g$, 1200 $m^2/g$, 1500 $m^2/g$, 1800 $m^2/g$, 2000 $m^2/g$, 2500 $m^2/g$, 3000 $m^2/g$, 3500 $m^2/g$, 4000 $m^2/g$, 4500 $m^2/g$, or 5000 $m^2/g$, or within a range bounded by any two of these values.

The pores can also possess a degree of uniformity. The uniformity can be in any desired property, such as the pore diameter, wall thickness, or inter-pore spacing. Typically, by being substantially uniform is meant that the pores show no more than 15% or 10%, and more preferably, no more than 5%, 2%, 1%, 0.5%, or 0.1% deviation in one or more attributes of the pores. In a particular embodiment, the pores possess an ordered spatial arrangement with each other. The ordered arrangement can be either between micropores, and/or between mesopores, or between micropores and mesopores. In one embodiment, the ordered arrangement includes at least a partial clustering of micropores and/or mesopores, or a segregation of micropores from mesopores. In another embodiment, the ordered arrangement includes a patterned or symmetrical spatial arrangement of micropores and/or mesopores. The patterned spatial arrangement can be, for example, a hexagonal close packed or cubic arrangement.

The bimodal porous carbon component described herein is preferably prepared by treating a mesoporous carbon material (e.g., as prepared by the template methods of the art) with an activation reagent, such as potassium hydroxide (KOH), $O_2$, $H_2O$, $CO_2$, or $ZnCl_2$, under elevated temperature conditions (e.g., at least 700° C., 750° C., 800° C., or 850° C.), following by cooling to about room temperature (e.g., 15-30° C.), and then contact with water. Preferably, the produced carbon material is washed with water followed by treatment with an acidic aqueous solution (e.g., an aqueous solution of a mineral acid in a molarity of at least 0.05, 0.1, 0.5, or 1), and this, preferably followed by washing with deionized water. A particularly preferred method of making the bimodal porous carbon material is given in Example 1 below.

The micropores and mesopores are generally created by two different mechanisms, i.e., the micropores are generally created through the activation process described above, whereas the mesopores are generally created by the template process used in preparing the precursor mesoporous carbon material. The pore volumes of each set of pores can be independently adjusted, thereby permitting adjustment of the percentage of micropores with respect to mesopores. For example, the volume contribution or number of micropores can be adjusted, independently of mesopore volume contribution or number of mesopores, by adjusting conditions of the activation process, such as by choice of activation reagent, the temperature employed (e.g., from 400 to 1200° C.), and the time allotted to heating the carbon material at the elevated temperature (i.e., the activation time). Furthermore, as the mesopores can be conveniently prepared by use of a template (e.g., block copolymer, surfactant, silica particle, and polymer particle templates), the size, shape, structure, or other property of the mesopores can be adjusted by suitable adjustment of the template properties, such as by adjustment of template composition, molecular arrangement, amount of template, and post-treatment methods of the template.

The pore volumes of micropores and mesopores are generally measured by the $N_2$ adsorption method (also known as the Brunauer-Emmett-Teller (BET) measurement). In BET measurements, micropores are filled before mesopores as nitrogen gas pressure increases. The percentage of micropores and mesopores can be calculated based on the adsorbed volume of nitrogen gas at different pressures.

As used herein, the term "about" generally indicates within ±0.5%, 1%, 2%, 5%, or up to ±10% of the indicated value. For example, a pore size of about 10 nm generally indicates in its broadest sense 10 nm±10%, which indicates 9.0-11.0 nm. In addition, the term "about" can indicate either a measurement error (i.e., by limitations in the measurement method), or alternatively, a variation or average in a physical characteristic of a group (e.g., a population of pores).

At least a portion of the micropores is occupied by (i.e., "filled with" or "contains") elemental sulfur. The portion of micropores occupied by elemental sulfur can be, for example, at least 1, 2, 5, 10, 20, 30, or 40 volume % (vol %) of the micropores. However, preferably, at least 50 vol %, and more preferably, at least 60, 70, 80, 90, or 95 vol % of the micropores is occupied by elemental sulfur. In a preferred embodiment, substantially all of the micropores (e.g., at least 96, 97, 98, or 99 vol %) are occupied by elemental sulfur. Preferably, while at least a portion or all of the micropores contain elemental sulfur, at least a significant portion or all of the mesopores are not occupied by (i.e., do not contain) elemental sulfur. For example, preferably, no more than 50 vol %, and more preferably, no more than 40, 30, 20, 10, 5, 2, or 1 vol % of the mesopores is occupied by elemental sulfur.

The amount of sulfur contained in the sulfur-carbon composite (i.e., the "sulfur loading" in terms of weight percentage (wt %) of sulfur by total weight of the sulfur-carbon composite) depends on the total micropore volume of the composite material. Accordingly, the sulfur loading can be adjusted by suitable adjustment of the total micropore volume. As the total micropore volume increases, higher sulfur loadings are made possible. Thus, by suitable adjustment of the pore volume attributable to micropores, a sulfur loading of, for example, about 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt % or 90 wt %, can be attained. In other embodiments, the sulfur loading may preferably be within a range bounded by any two of the foregoing exemplary values (for example, 10-90 wt %).

In another aspect, the invention is directed to a film of the composite material described above. For purposes of functioning as a cathode material in a lithium battery, the film preferably possesses a thickness of at least 0.5 μm, and more preferably, at least 1 μm, 2 μm, 5 μm, 10 μm, 15 μm, 20 μm, 25 μm, 50 μm, 100 μm, 200 μm, 250 μm, 500 μm, 750 μm, or 1 mm, or within a particular range bounded by any two of the foregoing values.

In another aspect, the invention is directed to a layered material containing a current collector material having coated thereon a layer of the sulfur-carbon composite material described above. The layer of composite material can have any suitable thickness, including any of the exemplary thicknesses described above. The current collector material can be any conductive material with physical characteristics suitable for use in lithium-sulfur batteries. Some examples of suitable current collector materials include aluminum, nickel, cobalt, copper, zinc, conductive carbon forms, and alloys thereof. The current collector can be of any suitable shape and have any suitable surface morphology, including microstructural or nanostructural characteristics.

In another aspect, the invention is directed to a lithium-sulfur battery (i.e., "lithium ion battery" or "battery") which contains the above-described sulfur-carbon composite material as a cathode component. The lithium-sulfur battery of the invention preferably possesses the characteristic of being able to operate for at least 50, 60, 70, 80, 90, 100, 110, 120, 130, 140, 150, 160, 170, 180, 190, 200, 210, 220, 230, 240, or 250 cycles while maintaining a specific discharge capacity (i.e., "discharge capacity" or "capacity") of at least 350, 400, 450, 500, 600, 700, 800, 900, 1000, 1100, 1200, 1300, 1400, or 1500 mA-hr/g.

As known in the art, the battery necessarily includes a lithium anode, as well as a lithium-containing electrolyte medium in contact with the anode and cathode. In one embodiment, the lithium-containing electrolyte medium is a liquid. In another embodiment, the lithium-containing electrolyte medium is a solid. In yet another embodiment, the lithium-containing electrolyte medium is a gel.

Preferably, the electrolyte medium includes a matrix material within which is incorporated one or more lithium ion electrolytes. The lithium ion electrolyte can be any lithium ion electrolyte, and particularly, any of the lithium ion electrolytes known in the art.

In one embodiment, the lithium ion electrolyte is non-carbon-containing (i.e., inorganic). For example, the lithium ion electrolyte can be a lithium ion salt of such counteranions as hexachlorophosphate ($PCl_6^-$), hexafluorophosphate ($PF_6^-$), perchlorate, chlorate, chlorite, perbromate, bromate, bromite, periodiate, iodate, aluminum fluorides (e.g., $AlF_4^-$), aluminum chlorides (e.g., $Al_2Cl_{hu\ -}$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates. Generally, the lithium halides are not considered as lithium ion electrolytes.

In another embodiment, the lithium ion electrolyte is carbon-containing (i.e., organic). The organic counteranion may, in one embodiment, lack fluorine atoms. For example, the lithium ion electrolyte can be a lithium ion salt of such counteranions as carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecyl-benzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), anionic carborane clusters, the alkylsulfates (e.g., diethylsulfate), alkylphosphates (e.g., ethylphosphate or diethylphosphate), dicyanamide (i.e., $N(CN)_2^-$), and the phosphinates (e.g., bis-(2,4,4-trimethylpentyl)phosphinate). The organic counteranion may, in another embodiment, include fluorine atoms. For example, the lithium ion electrolyte can be a lithium ion salt of such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonimides (e.g., $(CF_3SO_2)_2N^-$).

The lithium ion electrolyte is incorporated in the electrolyte medium preferably in an amount which imparts a suitable level of conductivity to the electrolyte medium. The conductivity of the electrolyte medium is preferably at least 0.01 mS/cm (0.001 S/m) at an operating temperature of interest, and particularly at a temperature within 20-30° C.

In a preferred embodiment, the electrolyte medium further includes one or more halide-containing additives (i.e., "halide additives"). The halide additive can be any halide-containing ionic compound or material (i.e., a salt). The halide considered herein can be, for example, fluoride ($F^-$), chloride ($Cl^-$), bromide ($Br^-$), or iodide ($I^-$), or a combination thereof. The countercation can be any inorganic or organic countercation. The inorganic countercation is typically either an alkali (i.e., Group I) or alkaline earth (i.e., Group II) metal cation. However, boron-group (i.e., Group III), carbon-group (i.e., Group IV, except those halocarbons which contain only a covalent instead of an ionic carbon-halogen bond), nitrogen-group (i.e., Group V, except for nitrogen halides), and transition-metal halide compounds are also considered herein, as long as the halide compound or material is not corrosive to the lithium anode. It is preferable for the halide additive to be completely soluble in the matrix material. The halide additive can be, for example, one or more lithium halides (e.g., LiF, LiCl, LiBr, LiI), sodium halides (e.g., NaF, NaCl, NaBr, NaI), potassium halides (e.g., KF, KCl, KBr, KI), rubidium halides (e.g., RbF, RbCl, RbBr, RbI), magnesium halides (e.g., $MgF_2$, $MgCl_2$, $MgBr_2$, $MgI_2$), calcium halides (e.g., $CaF_2$, $CaCl_2$, $CaBr_2$, $CaI_2$), strontium halides (e.g., $SrF_2$, $SrCl_2$, $SrBr_2SrI_2$), barium halides (e.g., $BaF_2$, $BaCl_2$, $BaBr_2$, $BaI_2$), Group III halides (e.g., $BF_3$, $BCl_3$, $AlF_3$, $AlCl_3$, TlF, TlCl, and related compounds or complexes), Group IV halides (e.g., $SiCl_4$, $SnCl_2$, $SnCl_4$), Group V halides (e.g., $PCl_3$, $AsCl_3$, $SbCl_3$, $SbCl_5$), transition-metal halides (e.g., $TiCl_4$, $ZnCl_2$), rare-earth halides (e.g., $LaF_3$, $LaCl_3$, $CeF_3$, $CeCl_3$), ammonium halides (e.g., $NH_4F$, $NH_4Cl$, $NH_4Br$, $NH_4I$), alkylammonium halides (e.g., $MeNH_3Cl$, $Me_2NH_2Cl$, $Me_3NHCl$, $Me_4NCl$, $Et_4NCl$, $Bu_4NF$, $Bu_4NBr$, where Me is methyl, Et is ethyl, and Bu is n-butyl), or a combination of any of these. In other embodiments, one or more of the foregoing groups of halide compounds or materials are excluded from the electrolyte medium.

Preferably, the halide-containing additive is present in the electrolyte medium in at least a trace amount (e.g., at least 0.001 M or 0.001 m, where "M" indicates a molarity concentration and "m" indicates a molality concentration). In different embodiments, the halide additive is present in a minimum amount of, for example, 0.01 M, 0.05 M, 0.1 M, 0.2 M, 0.3 M, 0.4 M, 0.5 M, 0.6 M, 0.7 M, 0.8 M, 0.9 M, 1.0 M, 1.1 M, 1.2 M, 1.3 M, 1.4 M, or 1.5 M. In other embodiments, the halide additive is present in a maximum amount of, for example, 0.5 M, 0.6 M, 0.7 M, 0.8 M, 0.9 M, 1.0 M, 1.1 M, 1.2 M, 1.3 M, 1.4 M, 1.5 M, 1.6 M, 1.7 M, 1.8 M, 2.0 M, 2.1 M, 2.2 M, 2.3 M, 2.4 M, or 2.5 M. In other embodiments, the halide additive is present in an amount within a range bounded by any combination of minimum and maximum values given above, provided that the minimum value is less than the maximum value. Any of the concentrations given above in terms of molarity (M) can alternatively be understood to be molality (m) concentrations.

In the case of a liquid electrolyte medium, the matrix is a liquid, i.e., composed of one or more solvents. The one or more solvents are preferably non-reactive with the materials of the anode and the cathode, and furthermore, do not have a deleterious effect on the performance characteristics of the lithium ion battery. Preferably, the one or more solvents are polar aprotic solvents. Some examples of polar aprotic solvents include the nitriles (e.g., acetonitrile, propionitrile), sulfoxides (e.g., dimethylsulfoxide), amides (e.g., dimethylformamide, N, N-dimethylacetamide), organochlorides (e.g., methylene chloride, chloroform, 1,1,-trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA).

Preferably, in addition to being polar aprotic solvents, the one or more solvents contain one or more oxyether (i.e., carbon-oxygen-carbon) groups. More preferably, the one or more solvents are ether solvents, i.e., polar aprotic solvents formulated as hydrocarbons except that they contain one or more carbon-oxygen-carbon groups (e.g., one, two, three, four, five, or six C—O—C groups) in the absence of any other chemical groups. The ether solvents typically contain at least three, four, five, six, seven, or eight carbon atoms, and up to nine, ten, eleven, twelve, or higher number of carbon atoms, and can be acyclic or cyclic. The ether solvent may also be saturated, or alternatively, unsaturated (i.e., by the presence of one or more carbon-carbon double or triple bonds).

Some examples of acyclic ether solvents containing one oxygen atom include diethyl ether, di(n-propyl)ether, diisopropyl ether, diisobutyl ether, methyl(t-butyl)ether, and anisole. Some examples of acyclic ether solvents containing two or more oxygen atoms include ethylene glycol dimethyl ether (i.e., dimethoxyethane, or DME, or glyme), diethylene glycol dimethyl ether (diglyme), triethylene glycol dimethyl ether (triglyme), and tetraethylene glycol dimethyl ether (tetraglyme). The foregoing exemplary acyclic ether solvents all contain methyl groups as endcapping groups. However, any hydrocarbon endcapping groups are suitable. Some common endcapping groups aside from methyl groups include, allyl, vinyl, n-propyl, isopropyl, n-butyl, isobutyl, sec-butyl, and t-butyl groups.

Some examples of cyclic ether solvents containing one oxygen atom include propylene oxide, 2,3-epoxybutane (i.e., 2,3-dimethyloxirane), oxetane, tetrahydrofuran (THF), furan, tetrahydropyran, and pyran. Some examples of cyclic ether solvents containing two or more oxygen atoms include 1,3-dioxolane, 1,3-dioxane, 1,4-dioxane, 1,3,5-trioxane, and the crown ethers.

In a preferred embodiment, the one or more solvents include at least one solvent which is an aprotic ether solvent that has a tendency to polymerize, particularly in the presence of a halide (as provided, for example, when a halide-containing additive is included). Particularly preferred in this respect are the cyclic ethers, and in particular, one or a combination of solvents selected from 1,3-dioxolane, dimethoxyethane, and 1,3,5-trioxane. The polymerization of these solvents during cycling in the presence of a halide-containing additive has been found to advantageously improve the cycling performance of lithium-sulfur batteries.

Preferably, the electrolyte medium excludes a protic liquid. Protic liquids are generally reactive with the lithium anode. Some examples of polar protic solvents which are preferably excluded include water, the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine).

In one embodiment, the electrolyte medium includes a non-polar liquid. Some examples of non-polar liquids include the liquid hydrocarbons, such as a pentane, hexane, heptane, octane, pentene, hexene, heptene, octene, benzene, toluene, or xylene. In another embodiment, non-polar liquids are excluded from the electrolyte medium.

The electrolyte medium may also include one or more surfactants. The surfactants can be included to, for example, modify or adjust the electrolyte electron or ion transport properties. The surfactant can be either an anionic, cationic, or zwitterionic surfactant.

Some examples of anionic surfactants include the fluorinated and non-fluorinated carboxylates (e.g., perfluorooctanoates, perfluorodecanoates, perfluorotetradecanoates, octanoates, decanoates, tetradecanoates, fatty acid salts), the fluorinated and non-fluorinated sulfonates (e.g., perfluorooctanesulfonates, perfluorodecanesulfonates, octanesulfonates, decanesulfonates, alkyl benzene sulfonate), and the fluorinated and non-fluorinated sulfate salts (e.g., dodecyl sulfates, lauryl sulfates, sodium lauryl ether sulfate, perfluorododecyl sulfate, and other alkyl and perfluoroalkyl sulfate salts).

The majority of cationic surfactants contain a positively charged nitrogen atom, such as found in the quaternary ammonium surfactants. A particular class of cationic surfactants considered herein include the quaternary ammonium surfactants. Some examples of quaternary ammonium surfactants include the alkyltrimethylammonium salts, dialkylmethylammonium salts, trialkylmethylammonium salts, and tetraalkylammonium salts, wherein the alkyl group typically possesses at least 3, 4, 5, or 6 carbon atoms and up to 14, 16, 18, 20, 22, 24, or 26 carbon atoms. Another group of cationic surfactants are the pyridinium surfactants, such as cetylpyridinium chloride. The counteranions in the cationic surfactants can be, for example, a halide, hydroxide, carboxylate, phosphate, nitrate, or other simple or complex anion.

Some examples of zwitterionic surfactants include the betaines (e.g., dodecyl betaine, cocamidopropyl betaine) and the glycinates.

In another aspect, the invention is directed to a method for preparing the sulfur-carbon composite material described above. The method includes impregnating a bimodal porous carbon component, having the characteristics described above, and as prepared by methods known in the art, or as described herein, with a solution of elemental sulfur. The elemental sulfur considered herein can be any allotropic form of sulfur. The elemental sulfur considered herein typically consists predominantly of crown-shaped $S_8$ molecules. However, numerous other forms and allotropes of sulfur are known, all of which are considered herein. For example, by appropriate processing conditions, elemental sulfur containing $S_6$, $S_7$, $S_9$, $S_{10}$, $S_{11}$, $S_{12}$, or up to $S_{18}$ rings, or linear or branched forms, can be formed. In addition, the sulfur can be crystalline (e.g., of a rhombic or monoclinic space group) or amorphous. The elemental sulfur is dissolved in a solvent to form the solution of elemental sulfur. The solvent is any solvent capable of dissolving elemental sulfur to the extent that a solution of, preferably, at least 1 wt % (and more preferably, 2, 5, 10, 15, or 20 wt %) sulfur is obtained. Some examples of such solvents include benzene, toluene, and carbon disulfide.

The driving force which determines the order in which pores are filled is the adsorption energy, which increases with decreasing pore size. Due to the higher adsorption energy of the micropores as compared to the mesopores, the impregnation step described herein first impregnates the micropores with sulfur before the mesopores become impregnated with sulfur. Once the micropores are filled, the small mesopores (i.e., of about 3 or 4 microns) will start to fill. Application of a heating (i.e., annealing) step after the impregnation step can further ensure that the micropores are filled first.

After the bimodal porous carbon component (i.e., "carbon" or "carbon material") has been impregnated with sulfur, the solvent is substantially removed from the sulfur-impregnated carbon (i.e., the sulfur-impregnated carbon is dried). By being "substantially removed" is meant that at least 80%, and more preferably, at least 90%, 95%, or 98% of the solvent is removed. Any method of drying can be used, including, for example, air-drying at ambient temperature (e.g., 15-30° C.), application of a vacuum, and/or heating, e.g., for a suitable period of time at a temperature of at least 30° C., but no more than 40° C., 50° C., 60° C., 70° C., 80° C., 90° C., or 100° C. After the drying step is complete, if desired, another impregnation step can be applied to the dried sulfur-impregnated carbon, followed by another drying step. Any number of impregnation-drying cycles can be applied to the carbon material depending on the loading of sulfur desired; i.e., as the number of impregnation-drying cycles applied to the carbon material is increased, the sulfur loading increases. By knowing the concentration of the sulfur solution and the amount (i.e., mass or volume, as appropriate) of the solution used in each impregnation step, the amount of sulfur impregnated in the carbon material can be calculated by multiplying the concentration of the solution and the amount of the solution used. By weighing the carbon material before impregnation with sulfur, the amount of sulfur needed to achieve a particular sulfur loading can also be known.

The impregnation and drying process can be followed by an annealing process (i.e., a post-annealing step). Alternatively, the drying step described above can be omitted, and the impregnation step followed directly by an annealing process. The drying process may also be replaced by an annealing process such that one or more impregnation-annealing cycles are applied to the porous carbon material. An annealing process is useful to remove residual amounts of solvents in the sulfur-impregnated carbon material. The annealing process can also be beneficial for filling the pores because sulfur preferably melts at the annealing temperature. The annealing process is preferably conducted at a temperature above 100° C., and more preferably at least at the melting point of sulfur (e.g., at least 115° C.), and below the boiling point of the elemental sulfur used, and more preferably, no more than 400° C. For example, in different embodiments, an annealing temperature of about 110° C., 120° C., 130° C., 140° C., 150° C., 160° C., 170° C., 180° C., 190° C., 200° C., 250° C., 300° C., 350° C., or 400° C. is used. Alternatively, the annealing temperature can be within a range bounded by any two of these values. Preferably, the annealing process is conducted under an inert atmosphere environment. Some examples of suitable inert gases include nitrogen and argon.

Examples have been set forth below for the purpose of illustration and to describe certain specific embodiments of the invention. However, the scope of this invention is not to be in any way limited by the examples set forth herein.

EXAMPLE 1

Figure 1:
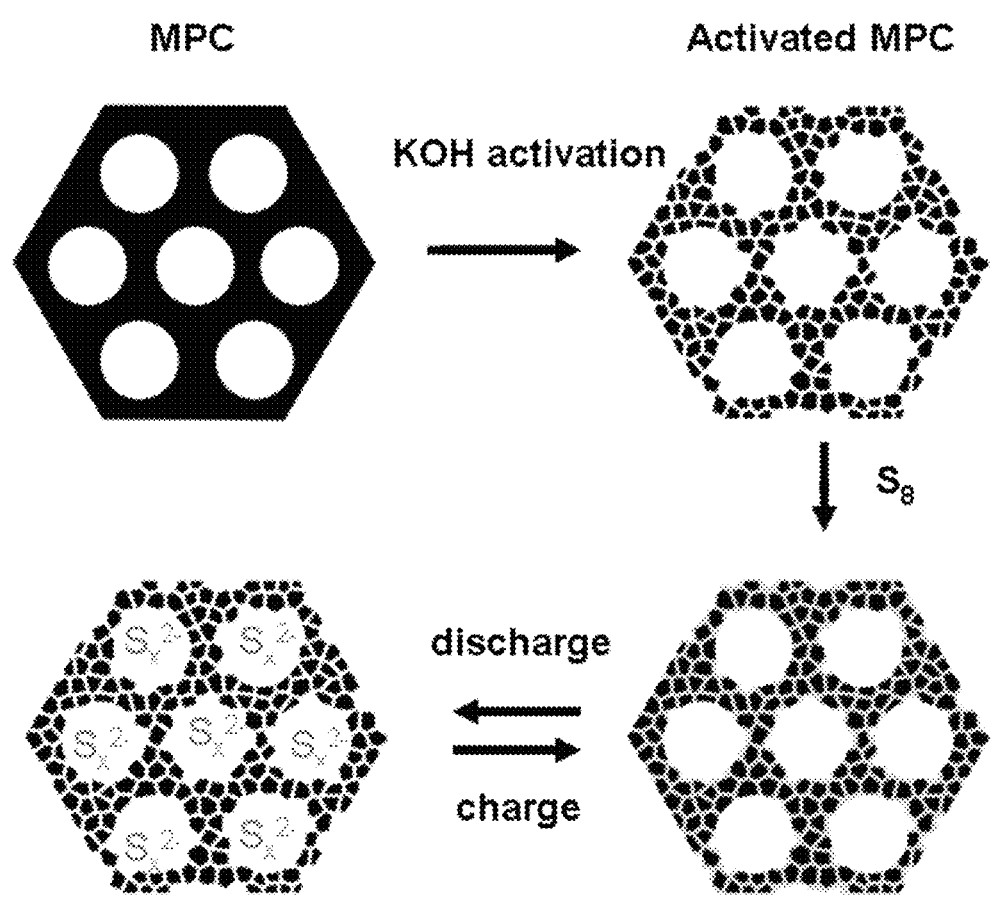
FIG. 1. Schematic depicting a general route for producing the sulfur-carbon composites of the invention, as well as the changes occurring in sulfur distribution and chemistry during discharging and charging cycles of a battery.

Preparation of the Bimodal Porous Carbon Material (a-MPC) and Treatment Thereof to Form the Sulfur-Carbon Composite The general procedure for preparing the sulfur-carbon composite is shown in FIG. 1. FIG. 1 also depicts the change in arrangement of sulfur in the bimodal carbon material during charging and discharging steps.

Preparation of bimodal porous carbon material (α-MPC). The precursor mesoporous carbon (MPC) was synthesized through a previously reported soft-template approach (Wang, X. Q.; Liang, C. D.; Dai, S. *Langmuir* 2008, 24, 7500-7505; Liang, C. D.; Dai, S. *Journal of the American Chemical Society* 2006, 128, 5316-5317; and Liang, C. D.; Hong, K. L.; Guiochon, G. A.; Mays, J. W.; Dai, S. *Angewandte Chemie-International Edition* 2004, 43, 5785-5789). The MPC has a uniform mesopore distribution at ca. 7.3 nm, an average wall thickness of about 6 nm, a specific Brunauer-Emmett-Teller (BET) surface area of 368.5 $m^2/g$, and a pore volume of 0.56 $cm^3/g$.

Figure 2:
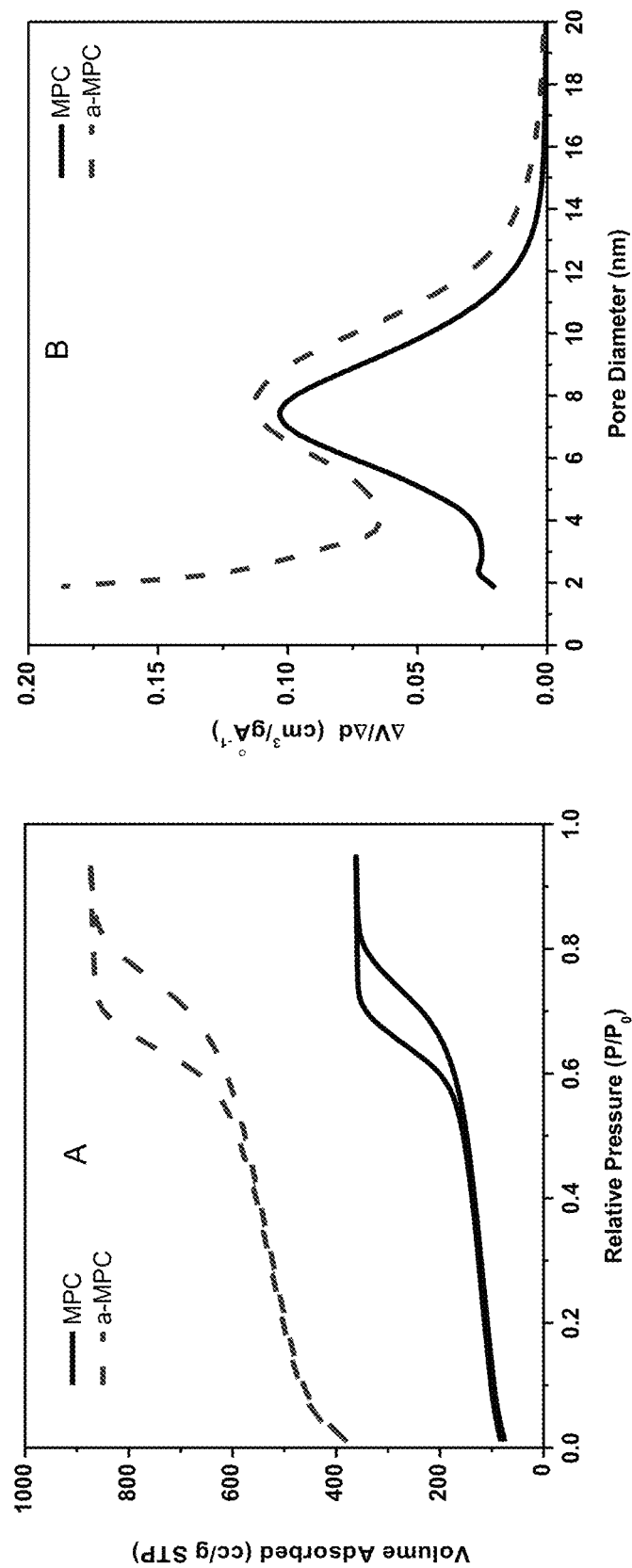
FIG. 2. Graphs showing nitrogen ($N_2$) adsorption/desorption characteristics of mesoporous carbon and KOH-activated mesoporous carbon: A) isotherms at 77 K; B) pore size distribution calculated by Barrett-Joyner-Halenda (BJH) method by using the adsorption branch of isotherm.

The MPC was treated by KOH activation. In the KOH activation process, the MPC particles (1 gram) were mixed with KOH pellets (4 grams) in a nickel crucible with a nickel lid. The crucible was heated to about 800° C. at a ramp rate of 10° C./min in a tube furnace under nitrogen. The temperature was maintained at about 800° C. for about 1 hour and then reduced down to about room temperature. The residue in the crucible was washed with a copious amount of deionized water and then boiled in 0.1 M HCl for about 30 minutes. The particles were recovered after filtration and washed to neutral pH with deionized water. The final product of activated mesoporous carbon (a-MPC) was dehydrated at about 200° C. for about 24 hours. After the KOH activation, the BET surface area of the activated MPC (a-MPC) increased to 1566.1 $m^2/g$; the micropore surface area contribution is 962.4 $m^2/g$. The MPC and a-MPC have type IV isotherms with H1 hysteresis (FIG. 2A). The pore size distribution plot in FIG. 2B shows that there is a significant increase of small mesopores from 2 nm to 4 nm, while the large mesopores are slightly enlarged. The micropore volume of the a-MPC calculated from the thickness-plot (also known as T-plot) is about 0.503 $cm^3/g$.

Figure 3:
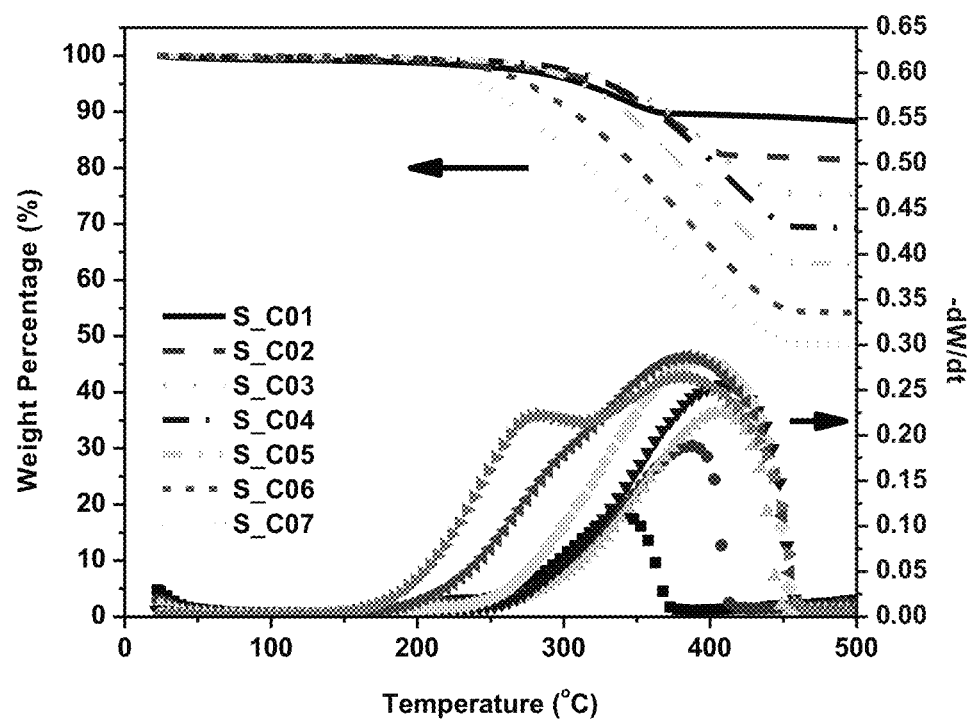
FIG. 3. Graph showing thennogravimetric analysis (TGA) results of S/C composites heated under a nitrogen atmosphere at a rate of 10° C./min.

Preparation of sulfur-carbon (S/C) composite material. Elemental sulfur was loaded to a-MPC through liquid phase infiltration by using sulfur solution in carbon disulfide ($CS_2$). The infiltration of sulfur in a-MPC was carried out through a repetitive solution impregnation/drying procedure to attain samples with various loading by using a 10 wt. % sulfur solution in $CS_2$. The carbon disulfide solvent was evaporated in a well-vented hood. After each impregnation/ drying cycle, each sample was annealed at 140° C. for 1 hour under nitrogen gas. The annealing step stripped away the residual $CS_2$. The resulting samples are denoted as S_C01 to S_C07 (which increase in sulfur loading from 11.7 wt. % to 51.5 wt. %) as determined by thermogravimetric analysis (TGA) in nitrogen. Shown in FIG. 3 are the TGA curves and derivative weight loss versus time (dw/dt) of the S/C composites. The derivative weight loss versus time indicates the relative evaporation rate of sulfur from the S/C composites.

EXAMPLE 2

Analysis of the Sulfur-Carbon Composite

Figure 4:
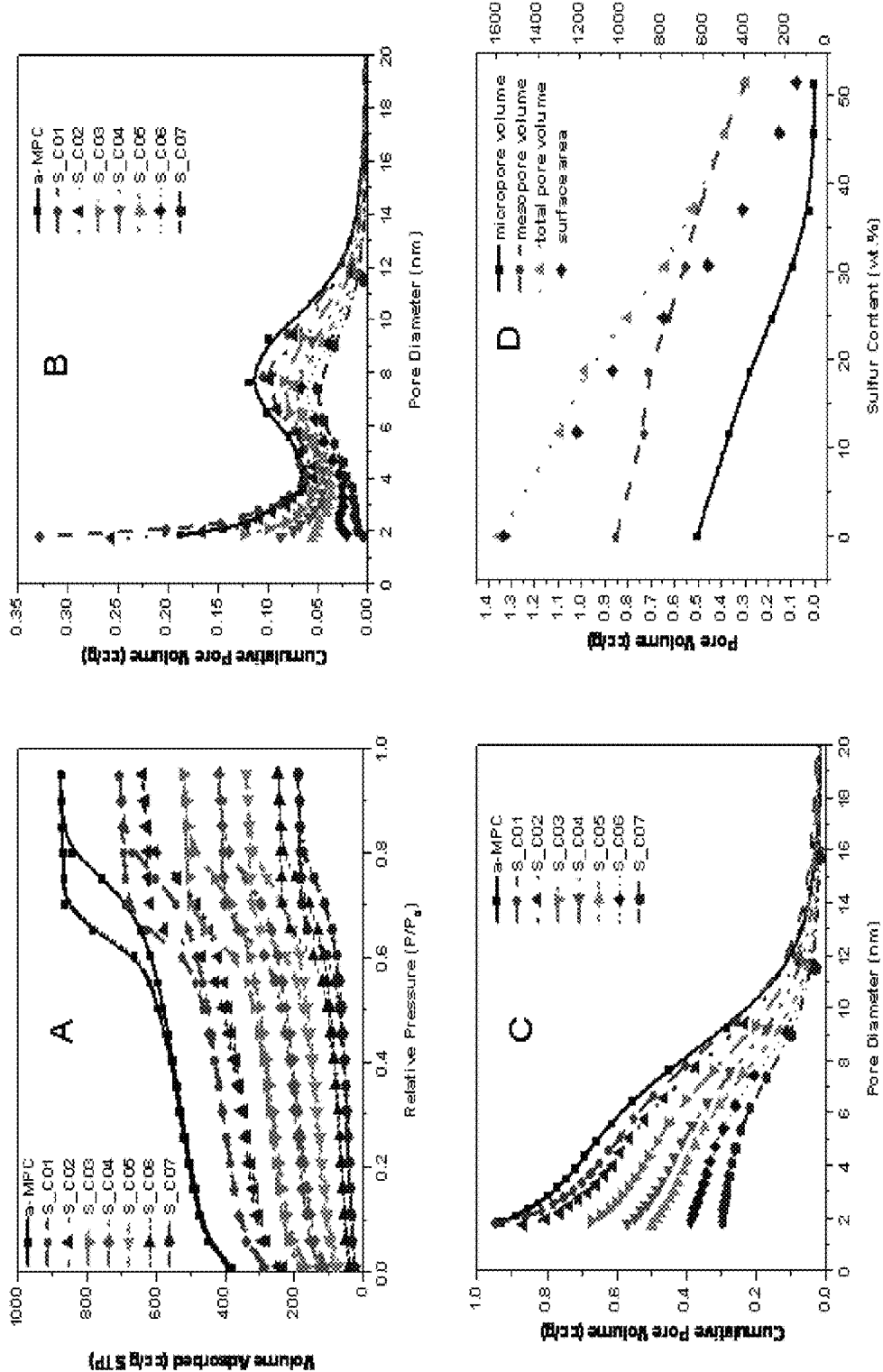
FIG. 4. Graphs showing nitrogen adsorption/desorption characteristics of S/C composites with various sulfur loading: A) isotherms at 77 K; B) pore size distribution calculated by BJH method by using the adsorption branch of isotherm; C) cumulative pore volume; and D) pore volume and surface area versus sulfur loading. The sample a-MPC is the blank activated mesoporous carbon without sulfur. The sulfur loading for samples S_C01 to S-C07 are 11.7, 18.7, 24.8, 30.7, 37.1 45.8, and 51.5 wt. %, respectively.

The surface area (SA) and pore size distribution (PSD) of the S/C composites produced as described in Example 1 were analyzed through $N_2$ adsorption/desorption measurements at 77 K and plotted in FIGS. 4(A and B). The $N_2$ isotherms of these samples have a capillary condensation step centered at relative pressure (P/P$_0$) of 0.7 and a H1 type hysteresis. The samples S_C01 to S_C05 have a bimodal pore size distribution with mesopores averaged at 7.3 nm. The cumulative pore volume (FIG. 4C) of samples with sulfur loading less than 37.1 wt. % shows an upward inflection point at pore diameter of 3 nm. Therefore, a portion of the pore volume and surface area of samples with sulfur loading less than 37.1 wt. % are attributed to small mesopores (pore size <3 nm) and micropores. FIG. 4D illustrates the dependence of pore volume and surface area on sulfur loading. The micropore volume was completely filled up when the sulfur loading is above 37.1 wt. %. The isotherm, surface area, and pore size distribution of the sample S_C05 (37.1 wt. %) is close to those of the original mesoporous carbon (MPC) before activation. The sulfur loading of 37.1 wt. % is most likely the critical point for these S/C composites: the micropores and small mesopores (<3 nm) in the a-MPC can accommodate up to 37.1 wt. % of elemental sulfur; higher sulfur loading could lead to the occupation of larger mesopores.

EXAMPLE 3

Assembly of Lithium-Sulfur Batteries

The S/C composites, prepared as described above, were pulverized by a ball mill and sieved through a 25 μm-opening stainless steel sieve. Slurries were prepared by mixing the S/C composites in a solution of 1 wt. % poly(vinylidene fluoride) (PVDF) in anhydrous N-methyl-2-pyrolidinone (NMP) in a 1:5 ratio. The slurries were applied to 10 mm diameter aluminum current collectors and dried at 120° C. for 4 hours. For the purpose of comparison, the original mesoporous carbon (MPC) with 24.1 wt. % sulfur loading and WVA-1500 (MeadWestvaco Corporation) with sulfur loading of 25.2 wt. % were also prepared as cathodes according to the same procedure used for the preparation of S/C composite cathodes. The batteries were assembled as Swagelok cells by using the S/C composite coated aluminum foil (10 mm diameter, 7 mm thick) as the cathode, and a lithium foil (7 mm thick and 10 mm diameter) as the anode, a Celgard 3225 separator (10.3 mm diameter), and an organic electrolyte. The organic electrolytes were solutions of bis(trifluoromethane)sulfonimide lithium (LiTFSI) (99.95% trace metals basis) and halides (e.g., LiBr, LiCl, or mixture of these two compounds) in a mixed solvent of 1,3-dioxolane (DOL) and dimethoxyethane (DME) with volume ratio of 55:40. In addition to the mixture of DOL/ DME (55:40), organic solvents, including 1,3-dioxolane (DOL), dimethoxyethane (DME), trioxane (TO), crown ethers, tetrahydrofuran (THF), glymes, and polyethyleneoxide (PEO), in a broad range of mixing ratios, were also investigated. The organic electrolyte filled the pores of the cathode and separator. The cathode, separator, and anode were pressed by a spring to ensure tight contact. A typical cell contained about 1 mg of S/C composite. No excess of electrolytes were left in the assembled cell.

EXAMPLE 4

Testing of the Lithium-Sulfur Batteries

The batteries were tested in a Maccor 4000 series battery tester. The batteries underwent cycling between 1.0 to 3.6 volts. Each cycle was started with the discharge half cycle. Unless specified, all batteries were tested at the same current of 0.5 mA for both charging and discharging. The end of charge cycle was determined by one of two conditions: (1) a charging current lower than 0.05 mA, or (2) a total charging capacity greater than 1675 mAh/g, the theoretic maximum of the sulfur cathode. All capacities are normalized by the mass of the sulfur.

Figure 5:
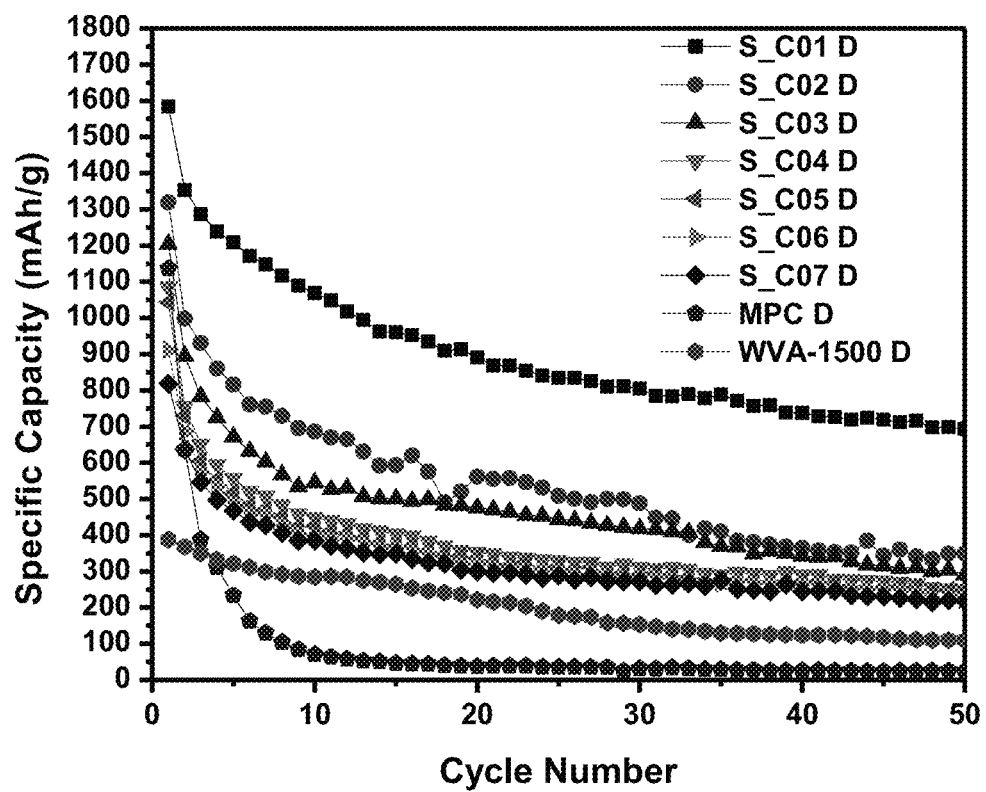
FIG. 5. Graph showing the specific discharge capacity of S/C composites that were cycled in 1.0 molal (i.e., 1.0 m) LiTFSI in DOL/DME (55:40) at 25° C.

The electrochemical performance of the S/C composites with various sulfur loadings were tested by using 1.0 m LiTFSI in DOL/DME (55:40). In order to illustrate the advantageous properties of the S/C composites prepared from the a-MPC, two additional S/C composites were prepared by using the MPC that is a material which contains only mesopores, and WVA-1500, an activated microporous carbon which contains mainly micropores. The surface area of WVA-1500 is 1760 m$^2$/g, which is comparable to that of the a-MPC. The specific discharge capacities of these cathodes were plotted versus cycle numbers in FIG. 5. The S/C composites prepared from mesoporous carbons including a-MPC and MPC had high initial discharge capacities.

The initial discharge capacity decreased with the increase of sulfur loading. When the sulfur loading was 11.7 wt. %, demonstrated by sample S_C01, the specific capacity of the initial discharge was as high as 1584.56 mAh/g, which was about 94.6% of sulfur utilization based on the theoretical maximum 1675 mAh/g. When the sulfur loading was 51.5 wt. %, i.e. sample S_C07, the initial discharge capacity was 818.22 mAh/g. It is worth noting that the MPC-supported S/C composite with 24.1 wt. % sulfur had an initial discharge capacity of 1135.87 mAh/g. Of striking contrast, the S/C composite prepared from WVA-1500 with 25.2 wt. % sulfur loading displayed a very low initial discharge capacity of only 387.64 mAh/g. Therefore, it is evident that the presence of mesopores accounts for the high initial discharge capacity. Although the MPC-supported S/C composite had a high initial discharge capacity, it had a very fast decay of capacity in the following cycles. The capacity of the MPC-supported S/C composite dropped to 163 mAh/g at the sixth cycle. The a-MPC and WVA-1500-supported S/C composites showed high retention of capacities in the cell cycling. The sample S_C01 retained a capacity of 804.94 mAh/g after 30 cycles, and the WVA-1500-supported S/C composites had a capacity of 153.5 mAh/g after 30 cycles, though, as stated above, its initial discharge capacity was only 387.64 mAh/g. The comparison of the cycling performances of S/C composites supported by MPC, WVA-1500, and a-MPC demonstrates the following points: (1) the mesopores enable the S/C composite to have a high initial discharge capacity; and (2) the micropores promote retention of cell capacity during the cycling.

Figure 6:
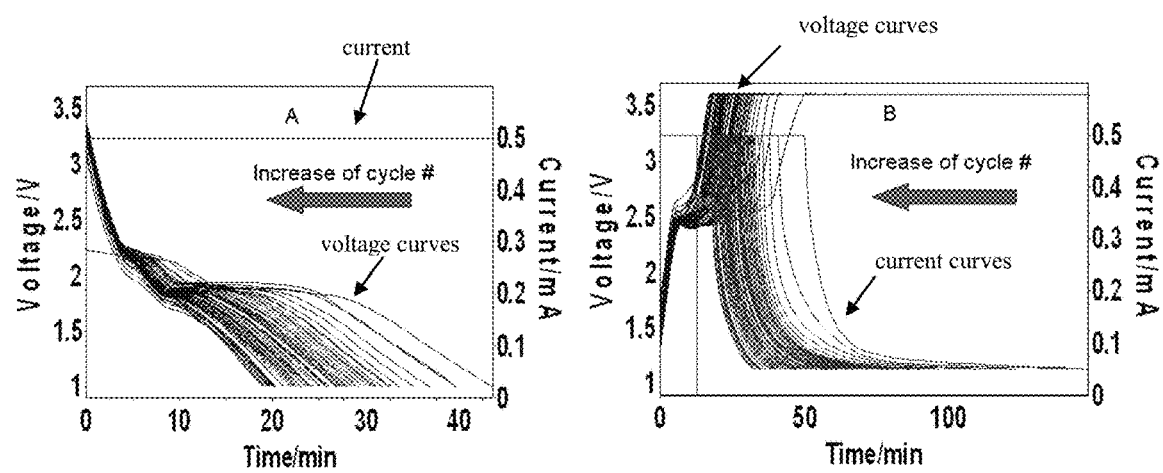
FIG. 6. Current-voltage (I-V) curves of a Li/S battery composed of a cathode made from S_C03 S/C composite, an anode of lithium (Li) foil, and an electrolyte of 1.0 LiTFSI in DOL/DME (55:40): (A) discharging cycles, and (B) charging cycles. The battery was cycled between 1.0 to 3.6 volts at 25° C. for 50 cycles.

As mentioned earlier, the capacity decay of the Li/S battery is caused by the intrinsic polysulfide shuttle. As long as the concentration gradient of polysulfide exists in the Li/S battery, the polysulfide shuttle phenomenon remains. The physical adsorption of microporous materials such as a-MPC and WVA-1500 can mitigate the migration of sulfur; nonetheless, the sulfur transport from the cathode to anode is evidenced by the obvious capacity decay shown in FIG. 5 and the cycling current-voltage (I-V) curves shown in FIG. 6. The cycling I-V curves in FIG. 6 are plots of sample S_C03 cycling for 50 cycles with an electrolyte of 1.0 M LiTFSI in DOL/DME (55:40). The cell had two discharge voltage plateaus at 2.2 and 1.9 volts respectively for the initial discharge. These two plateaus progressively decreased in voltage and duration as the cycles were continued. The two plateaus diminished to 1.9 and 1.6 volts after 50 cycles (FIG. 6A). A typical charging I-V curve of the Li/S battery has a curvy region at average voltage of 2.4 volts. The region has a slow increase of voltage during the charging because of the oxidation of polysulfide anions. A rapid increase of voltage follows the curvy region at the end of charging due to the depletion of polysulfide anions. The average voltage and the duration of the curvy region reflect the internal resistance and the charging capacity of the Li/S battery. The plot in FIG. 6B shows that the average voltage of each cycle increases and the duration diminishes when the cycle number increases. Apparently, the cell resistance and capacity of the S_C03 cathode decreases with the advancing of cycle numbers. All these changes are attributed to the polysulfide shuttle, which causes the irreversible migration of sulfur from the cathode to the anode.

EXAMPLE 5

Preparation and Testing of Lithium-Sulfur Batteries Containing a Halide Additive In this experiment, a halide additive was incorporated into the electrolyte medium in order to improve the cyclability and the utilization of sulfur in Li/S batteries. As further discussed below, the surprising result was found that the halide additive alters the battery chemistry during the charging and discharging of the Li/S battery, thereby influencing the polysulfide shuttle with the end result of driving the migrating sulfur back to the cathode during the charging cycle.

Figure 7:
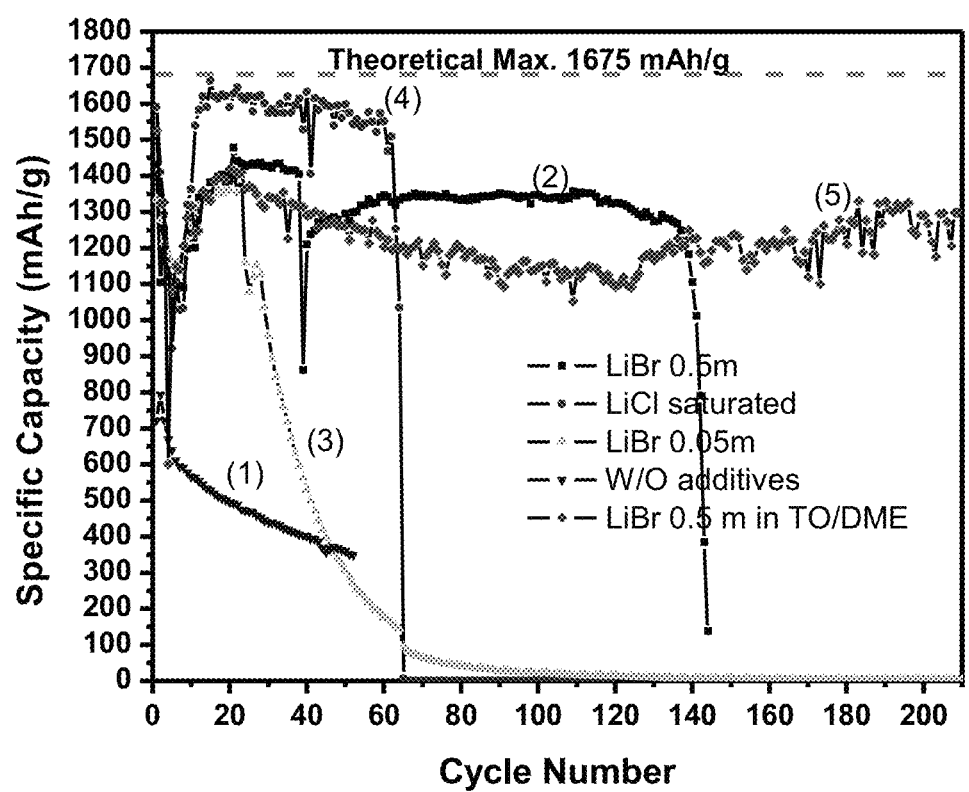
FIG. 7. Graph showing cyclabilities of Li/S batteries with different electrolytes and halide additives: (1) 1.0 m LiTFSI in DOL/DME (55:40), down triangles (2) 1.0 m LiTFSI in DOL/DME (55:40) with 0.5 m LiBr, squares; (3) 1.0 m LiTFSI in DOL/DME (55:40) with 0.05 m LiBr, up triangles; (4) 1.0 m LiTFSI in DOL/DME (55:40) with saturated LiCl (about 0.15 m), dots; and (5) 1.0 m LiTFSI in TO/DME (55:40) with 0.5 m LiBr, diamonds.

The sample S_C03 was used as test cathode material for the demonstration of the effect of halide addition. The cathodes and batteries were prepared by using the procedure described in the preceding text, except that the electrolyte was prepared as described herein. All cells were cycled between 1.0 to 3.6 volts with a current of 0.5 mA for both charging and discharging. The charging cycles were set at the cut-off current of 0.05 mA and cut-off capacity of 1675 mAh/g of sulfur. The charging cycles ended when either of these two cut-off conditions was met. The cycling capacities were plotted in FIG. 7. A comparative battery was made by using 1.0 m LiTFSI in DOL/DME (55:40) without adding any halide salt. The test cells were assembled using the following electrolytes: (1) 1.0 m LiTFSI in DOL/DME (55:40) with 0.5 m LiBr; (2) 1.0 m LiTFSI in DOL/DME (55:40) saturated with LiCl (approximately 0.15 m); (3) 1.0 m LiTFSI in DOL/DME (55:40) with 0.05 m LiBr; and (4) 1.0 m LiTFSI in trioxane (TO)/DME (55:40).

The comparative battery had a high discharge capacity in the first 10 cycles. The capacity progressively diminished as the cycle number increased. The capacity dropped below 400 mAh/g after about 30 cycles. All test batteries had initial discharge capacities over 1300 mAh/g. The capacities decreased in the first 10 cycles and then rapidly increased to over 1100 mAh/g after 15 cycles. The high capacities were maintained after the 15$^{th}$ cycle. The cycle life of the battery depended on the electrolytes and the concentration of the halide. The battery with saturated LiCl in DOL/DME had the highest capacity, an average over 1600 mAh/g for cycles from the 12$^{th}$ to the 60$^{th}$ cycle. The battery suddenly died after 62 cycles due to a short caused by lithium dendrites that formed on the anode. The battery with 0.5 m LiBr in DOL/DME had an average capacity of over 1300 mAh/g for over 140 cycles. This battery also died due to lithium dendrites after 140 cycles. When the concentration of LiBr was decreased to 0.05 m, the cell died after 20 cycles.

Therefore, it is evident that the performance can be optimized by changing the concentration of halide in the electrolytes. A test battery with TO/DME showed a capacity over 1100 mAh/g with a cycle life over 210 cycles. Several batteries were also tested by using a single solvent, such as DME or triglyme. All cells showed improved cyclability and high utilization of sulfur.

Figure 8:
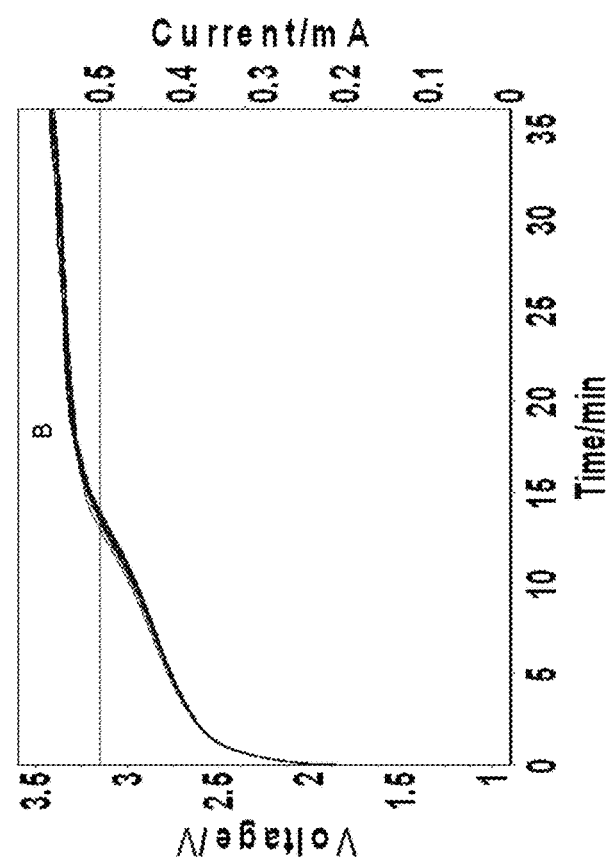
FIG. 8. Cycling current-voltage (I-V) curves of a Li/S battery composed of a cathode made from S_C03 S/C composite, an anode of Li foil, and an electrolyte of 1.0 m LiTFSI in DOL/DME (55:40) with 0.5 m LiBr as the additive. (A) discharging cycles, and (B) charging cycles.
Figure 8:
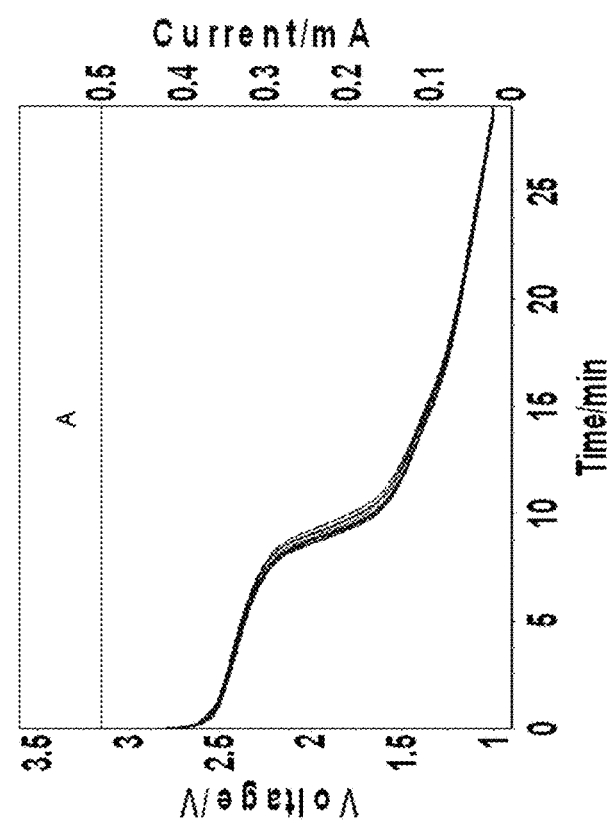

The halide additives made distinct changes to the shapes of the I-V curves. Shown in FIGS. 8A,B are the charging and discharging curves of the Li/S battery with 0.5 m LiBr in the electrolyte. These curves were plotted from the stable cycles. The discharge curves show a plateau at 2.4 volts and a shoulder at 1.5 volts. The curves are overlapping with each other, which indicates a very good cycling stability. The charging curves showed two plateaus at 2.6 and 3.2 volts, respectively. The additives significantly changed the charging curves by three aspects: (1) the charging voltage did not reach 3.6 volts; (2) the current remained at 0.5 mA during the entire charging cycle; and (3) the end of charging cycle was determined by cut-off capacity. The changes of the I-V curves suggest that the halide participates in the charging and discharging reaction, and thereby alters the reaction path of the Li/S batteries.

A plausible mechanism of the battery chemistry is illustrated in FIG. 9. In a Li/S battery of the art, the discharge typically involves several steps: from elemental sulfur to $S_8^{2-}$ and $S_6^{2-}$; from $S_8^{2-}$ and $S_6^{2-}$ to $S_4^{2-}$ for the high plateau; and from $S_4^{2-}$ to $S_2^{2-}$ and $S^{2-}$ for the low plateau. The charging is the reverse of these chemical reactions. When the halides are present in the reaction, the halide can be electrochemically reduced to elemental halogen or react with sulfur to form polysulfane dihalides. Without being bound by any theory, it is believed that the halogens and polysulfane dihalides react with $Li_2S$ formed on the electrodes to produce electrochemically reversible polysulfides. The polysulfides can then be further oxidized to elemental sulfur. Therefore, the halides facilitate the recovery of sulfur which had migrated to the anode through the polysulfide shuttle, while also substantially reducing or preventing the production of lithium sulfide at the anode. The recovery of sulfur to the cathode and minimization of lithium sulfide generation at the anode confer a high discharge capacity to the Li/S battery over long cycle periods.

Surprisingly, polymerization of DOL and TO on the cathode was observed when halides were added to the electrolytes. The polymer appears to promote retention of a high capacity over long cycle periods. Thus, the polymerization phenomenon observed on the cathode can be an additional effect useful for improving the energy output and usable lifetime of lithium-sulfur batteries.

While there have been shown and described what are at present considered the preferred embodiments of the invention, those skilled in the art may make various changes and modifications which remain within the scope of the invention defined by the appended claims.

What is claimed is:

1. A method of preparing a sulfur-carbon composite material for a cathodic material in a lithium ion battery, the method comprising:
   (i) impregnating a bimodal porous carbon component with a solution of elemental sulfur, wherein said bimodal porous carbon component contains a first mode of pores which are mesopores, and a second mode of pores which are micropores; and
   (ii) annealing the sulfur-impregnated bimodal porous carbon component under an inert atmosphere;
   wherein the resulting sulfur-carbon composite comprises:
      (i) said bimodal porous carbon component containing therein a first mode of pores which are mesopores, and a second mode of pores which are micropores, and (ii) elemental sulfur contained in at least a portion of said micropores; and
   wherein at least 60 vol % of the micropores in the resulting sulfur-carbon composite is occupied by elemental sulfur while no more than 5 vol % of the mesopores is occupied by elemental sulfur.

2. The method of claim 1, wherein the solution of elemental sulfur contains carbon disulfide as a solvent.

3. The method of claim 1, wherein at least 10% and no more than 90% of the pore volume of the bimodal porous carbon component is attributable to micropores.

4. The method of claim 1, wherein at least 20% and no more than 90% of the pore volume of the bimodal porous carbon component is attributable to micropores.

5. The method of claim 1, wherein at least 70 vol % of the micropores in the resulting sulfur-carbon composite is occupied by elemental sulfur while no more than 5 vol % of the mesopores is occupied by elemental sulfur.

6. The method of claim 1, wherein at least 80 vol % of the micropores in the resulting sulfur-carbon composite is occupied by elemental sulfur while no more than 5 vol % of the mesopores is occupied by elemental sulfur.

7. The method of claim 1, wherein at least 90 vol % of the micropores in the resulting sulfur-carbon composite is occupied by elemental sulfur while no more than 5 vol % of the mesopores is occupied by elemental sulfur.

8. The method of claim 1, wherein the micropores in the resulting sulfur-carbon composite are completely occupied by elemental sulfur while no more than 10 vol % of the mesopores are occupied by elemental sulfur.

9. The method of claim 1, wherein the micropores in the resulting sulfur-carbon composite are completely occupied by elemental sulfur while no more than 5 vol % of the mesopores are occupied by elemental sulfur.

* * * * *